United States Patent [19]
Baliozian

[11] Patent Number: 4,872,031
[45] Date of Patent: Oct. 3, 1989

[54] DEVICE FOR SIDE-LIGHTING A SUBJECT PLACED IN FRONT OF BACKGROUND AS WELL AS FOR LIGHTING THE BACKGROUND ITSELF, FOR EXAMPLE WHEN TAKING PICTURES OF THE SUBJECT BY PHOTOGRAPHY, CINEMATOGRAPHY OR THE LIKE

[76] Inventor: Mardick Baliozian, 10 E. Ontario St., Chicago, Ill. 60611

[21] Appl. No.: 157,386

[22] Filed: Feb. 18, 1988

[30] Foreign Application Priority Data
Feb. 24, 1987 [FR] France .................... 87 02378

[51] Int. Cl.⁴ ............................................. G03B 15/00
[52] U.S. Cl. ....................................................... 354/291
[58] Field of Search .......................................... 354/291

[56] References Cited
U.S. PATENT DOCUMENTS

| | | | |
|---|---|---|---|
| 1,954,869 | 4/1934 | Fitch | 354/291 X |
| 4,340,293 | 7/1982 | Russotti | 354/291 |

FOREIGN PATENT DOCUMENTS

| | | |
|---|---|---|
| 494646 | 3/1930 | Fed. Rep. of Germany . |
| 3443840 | 6/1986 | Fed. Rep. of Germany . |
| 771805 | 4/1957 | United Kingdom . |

*Primary Examiner*—Michael L. Gellner
*Attorney, Agent, or Firm*—Edward D. Gilhooly

[57] ABSTRACT

A device for side-lighting a subject placed in front of a background as well as for lighting the background itself, for example when taking pictures of the subject by photography, cinematography or the like, consists of a series of reflecting panels attached to a solid or hollowed-out common central background wall or attached to each other around a free surface corresponding to the rear end-wall of the assembly. These reflecting panels are disposed in raised and inclined positions with respect to the background plane of the assembly in orientations such that said panels are capable of reflecting the light emitted by a front light source towards the subject to be photographed as well as towards the rear end-wall of the assembly, the assembly being of generally concave shape.

20 Claims, 4 Drawing Sheets

DEVICE FOR SIDE-LIGHTING A SUBJECT PLACED IN FRONT OF BACKGROUND AS WELL AS FOR LIGHTING THE BACKGROUND ITSELF, FOR EXAMPLE WHEN TAKING PICTURES OF THE SUBJECT BY PHOTOGRAPHY, CINEMATOGRAPHY OR THE LIKE

BACKGROUND OF THE INVENTION

1. Field of the Invention

The present invention relates to a device for side-lighting a subject placed in front of a background as well as for lighting the background itself, for example when taking pictures of the subject by photography, cinematography or the like. However, this device may also be employed for a similar purpose around an object when exhibiting this latter in a display window.

2. Description of the Prior Art

When a predetermined subject (inanimate subject or living person) is photographed, the background must appear on the snapshot without showing objectionable shadows cast by the subject. Moreover, in some instances and especially in the case of identity-card photographs, it is necessary to ensure that a uniform white background appears behind the head of the photographed subject. In accordance with another desirable objective, however, the image of the photographed subject should stand out from the background, thus ensuring as far as possible that a three-dimensional effect is thus obtained.

One of the solutions currently applied for the achievement of a satisfactory result consists in using, not only a principal light source placed in front of the subject to be photographed, but also a number of additional light sources spaced at intervals around the subject. Some additional light sources are placed on each side in order to side-light the subject and thus to give this latter a sharper relief. For a similar reason, another additional light source is usually provided in an overhead location.

Another solution at present in use consists in placing a number of independent reflecting panels around the subject to be photographed. It is necessary in this case to provide different individual panels of this type, these panels being placed at various suitable points in order to illuminate the background employed as well as the sides of the subject and possibly also the upper portion of this latter.

However, these two solutions are both attended by undeniable drawbacks. First and foremost among these is clearly the increase in cost price of the installation which results from the presence of a certain number of additional light sources or independent reflecting panels. A further disadvantage lies in the need for accurate position-setting of these additional light sources and in the need to control their power and orientation or else to adjust in a judicious manner the particular orientation of each independent reflecting panel. However, this calls for the services of a skilled operator and results in waste of time.

Moreover, the method which consists in using individual reflecting panels cannot be applied in a certain number of cases, for example for the purpose of photographing an inanimate subject of small size. In this case, the panels usually employed would in fact be too bulky to be placed around the subject to be photographed. Furthermore, the erection and adjustment of such panels give rise to difficulties since supports for readily adjusting their orientation and maintaining them in the desired position do not exist.

For the reasons given in the foregoing, the aim of the present invention is to construct a device of an entirely different design with a view to providing a background of very good quality and optimum lighting of the subject without any need to make use of additional light sources or else individual reflecting panels disposed separately around the subject to be photographed. However, this device is also designed to achieve a further improvement in illumination of the subject to be photographed and of the background placed behind the subject.

SUMMARY OF THE INVENTION

To this end, the device in accordance with the invention is essentially constituted by a series of straight or curved or faceted reflecting panels attached to a solid or hollowed-out common central background wall or attached to each other around a free surface corresponding to the rear end-wall of the assembly. Said reflecting panels are disposed in raised and inclined positions with respect to the plane of the rear end-wall of the assembly or of the background panel in orientations such that said panels are capable of reflecting the light emitted by a front light source towards the subject to be photographed as well as towards the rear end-wall of the assembly, said assembly being of generally concave shape.

Thus the background provided and the subject placed in front of this latter are illuminated under optimum conditions by light rays which are so directed as to surround them entirely and which actually come from a single light source, namely the principal lighting source placed near the picture-taking camera opposite to the subject to be photographed.

In a particular embodiment, the device in accordance with the invention includes three reflecting panels disposed around a background panel or around a free surface corresponding to the rear end-wall of the assembly, namely a reflecting panel to be placed at the top and other reflecting panels to be disposed on each side of the subject to be photographed.

In another embodiment, the device in accordance with the invention includes two reflecting panels disposed on each side of a background panel which serves as a support for said reflecting panels.

DESCRIPTION OF THE PREFERRED EMBODIMENTS

Figure 1:
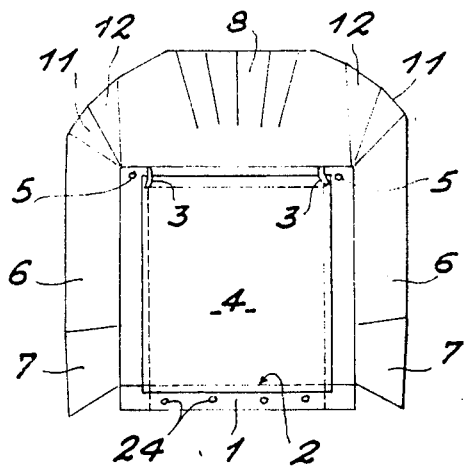
FIG. 1 is a view in front elevation showing a device in accordance with the invention.

In the example illustrated in FIG. 1, the device in accordance with the invention includes a plurality of reflecting panels attached to each other in succession around a frame 1 to which they are rigidly fixed. This frame defines the plane of the rear end-wall or background wall of the assembly and surrounds a free surface 2 having a contour of square shape or the like. In the majority of applications of this device, said frame is intended to be placed vertically against a wall or fixed on any other support. Said frame is in fact provided on its top edge with clips 3 or other suitable fastening means for mounting in front of said frame an element which is intended to constitute the background proper of a snapshot, for example a sheet 4 of paper having the desired characteristics.

However, the frame considered in the foregoing is also provided with means for fixing it against a wall or on any suitable support. Thus, for the purpose of fixing it against a wall, said frame may be provided simply with two holes 5 for receiving fixing nails. When it is desired to mount the frame on a special support such as a tripod, provision can be made for an attachment system for fixing the frame on a support of this type.

The frame 1 is adapted to carry two reflecting panels 6 and 7 on each side. These panels are turned inwards and inclined with respect to the plane of the rear end-wall of the assembly or in other words the plane of the frame 1. With respect to said plane, if the angles of the panels are adjustable with respect to the central background, they are capable of reflecting the light emitted by a light source 9 either solely towards the background 4 proper or both to the background 4 and to the sides of the subject to be photographed (a person's head 22, for example) or only to the sides of the subject, the light source 9 aforesaid being located opposite to said subject at a short distance above the camera 10. Thus the assembly has a generally concave shape or else the shape of a dish having inclined side walls and open on one side, namely the side corresponding to the lower end.

The surface of the side panels 6 and 7 is treated so as to ensure that these latter have suitable light-reflecting characteristics. To this end, said panels can advantageously have a metallized surface. However, these panels could be provided instead with a white coating but this would be less advantageous.

The edge of the frame 1 which is intended to be placed at the top is adapted to carry another reflecting panel 8. This top reflecting panel is forwardly inclined so as to form a predetermined angle with respect to the plane of the frame 1 in a manner similar to the side panels 6 and 7. Furthermore, this top panel is advantageously curved. The arrangement thus provided is such that, by means of said top panel located above the subject to be photographed, the light which comes from the front light source 9 can thus be reflected both on top of the subject and towards the background 4 proper.

At each end, the top panel 8 is joined to the side panels 6 by means of small intermediate faces or facets 11 and 12 which are separated from each other by folding lines.

All the different parts thus provided in the present device can be constituted by a single part of one-piece construction, the special shape of this part being accordingly obtained by any suitable method such as, for example, by injection molding, by thermoforming or by vacuum forming when this part is of plastic material. However, said part can also be made of metal by die-stamping or by application of any other suitable shaping process. As will readily be apparent, this single part could also be made of any other suitable material such as, for example, wood and the like.

But the different portions of the present device can also be constituted by separate components assembled together along their lines of junction. This form of construction is shown specifically in FIG. 4. In this arrangement, the frame 1 is replaced by a background panel 1a which is a full or solid panel. In regard to the reflecting panels on each side, they are each constituted by a part 13 forming the two corresponding panels 6a and 7a. On that edge which is intended to be attached to the corresponding edge of the background panel 1a, each of these parts 13 is provided with an edge strip 14 which is inclined with respect to the panels 6a and 7a at a predetermined angle in order to be fixed flat against the background panel 1a. This attachment is carried out by means of complementary press-studs 15 provided on each of the two corresponding parts. Thus, when the two parts 13 are fixed in position, the panels 6a and 7a are maintained in an inclined position with respect to the background panel 1a and in the desired orientation for producing a reflection of light under the conditions described earlier.

In regard to the top reflecting panel 8a of said device, this panel consists of a separate part 16 which also forms facets 11a and 12a provided at the ends of said panel. As in the case of the two lateral parts 13, said part 16 has an edge strip 17 which is intended to be fixed on the top edge of the background panel 1a as well as on the top edge of these two lateral parts 13. Said edge strip is therefore inclined at a predetermined angle with respect to the panel 8a as well as with respect to the end facets 11a in order to ensure that said panel and said facets are maintained at the desired angle of slope when the part 16 is fixed on the background panel 1a. This attachment may be carried out by making use of complementary press-studs 18 or of any other suitable means.

By virtue of the solution thus provided in the form of construction shown in FIG. 4, the device may again be formed of several distinct parts which can be folded flat when said device is not in use as well as during storage and transportation of the device before it is put up for sale. This accordingly offers an advantage in that it permits a considerable reduction in bulk during this period.

As indicated earlier, the background panel 1a provided in this particular embodiment is not hollowed-out. Thus the panel itself may constitute a suitable background for a photograph and its surface is chosen or treated accordingly. To this end, the panel surface may be provided with a white coating or else may be formed of white plastic. However, the top portion of the panel 1a can also be provided with fastening clips 3 in order to add a detachable background element, for example a sheet of paper 4 as in the preceding embodiment.

The panel 8a which has a curved shape can be constituted by a flat sheet of flexible material which can be readily shaped and in which folding grooves can advantageously be formed. However, this panel can also be formed by a part which has initially been given the desired shape by any suitable means such as molding.

In the embodiment which is illustrated in FIG. 1, it is also possible to provide a panel in the form of a full rear end-wall instead of a hollowed-out frame 1 as described earlier. In the case of a full-walled design, the panel itself may serve as a photographic background.

Figure 2:
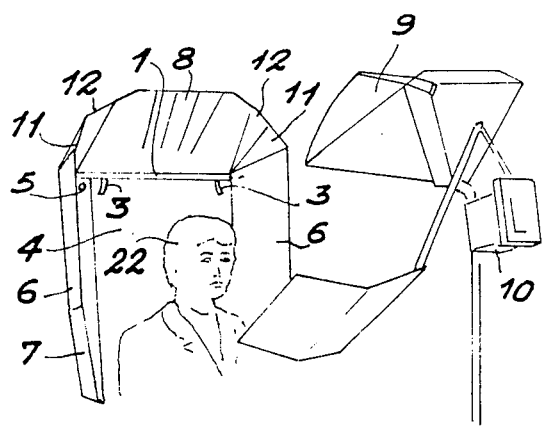
FIGS. 2 and 3 are views in perspective illustrating two particular modes of utilization of said device.

As already mentioned, the present device is primarily intended to serve both as a background behind a predetermined subject and to provide optimum lighting while the subject is being photographed. FIG. 2 illustrates the use of the device in accordance with the invention for taking a portrait photograph. In this case, the device is placed behind the head 22 of the subject to be photographed, the background frame 1 being placed in an essentially vertical position.

Figure 5:
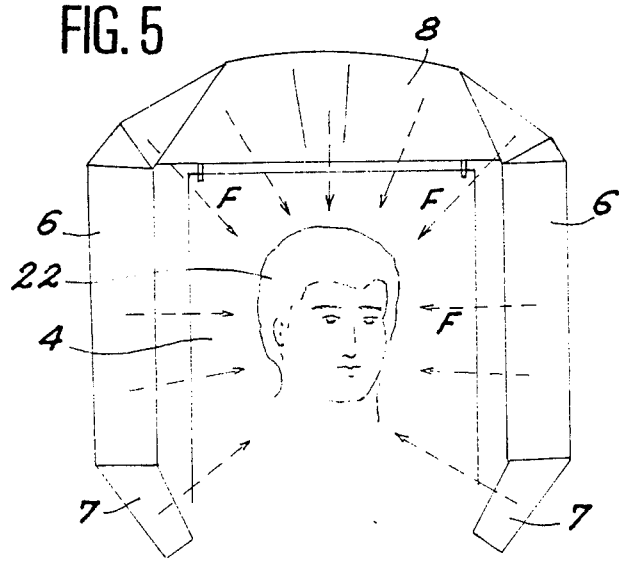
FIG. 5 is a view in elevation illustrating a particular mode of utilization of the present device.

When said device is thus in position, the reflecting top panel 8 is located above the subject's head whilst the reflecting side panels 6 and 7 are placed on each side of the subject's head. Thus certain light rays which come from the front light source 9 are reflected from the side panels 6 and 7 onto each side of the subject's head as well as onto the background 4 proper. Other light rays from the same light source are reflected from the top panel 8 onto the top of the subject's head 22 as well as onto the background 4. Under these conditions, the head of the subject to be photographed is illuminated around its entire periphery and is virtually flood-lit. The background panel 4 itself is also perfectly illuminated behind the subject's head, thus avoiding any shadows cast by the subject's head as would have been the case if the various reflecting panels 6, 7 and 8 of the device in accordance with the invention had not been present. Moreover, the different arrows F shown in FIG. 5 illustrate the manner in which the light rays are reflected from the different panels around the entire head 22 of the subject and towards the background 4 located behind the head. A point worthy of note in this connection is that, by reason of successive reflections of the light rays, there is a virtual increase in the quantity of light received by the subject to be photographed as well as by the background 4.

Figure 3:
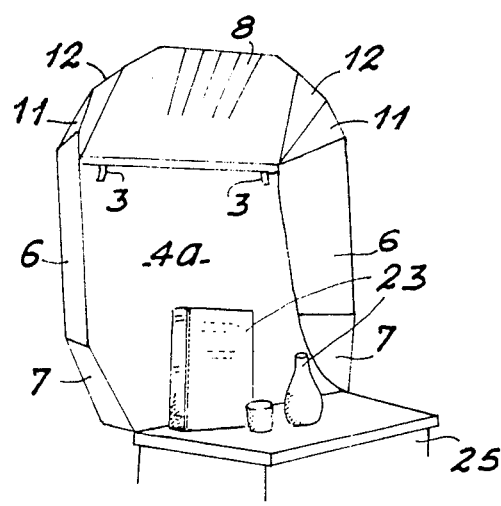

FIG. 3 illustrates the use of the device in accordance with the invention for taking pictures of small-sized objects 23 placed on a small table 25 or the like. In such a case, the present device is fixed vertically above said small table. There is accordingly placed against the background frame 1 or against the background panel 1a an added sheet 4a which is intended to constitute the background proper and has a sufficient length to extend also above the small table 25 as shown in FIG. 3. There is thus obtained a continuous background which extends both behind the objects 23 to be photographed and beneath these latter. It will be readily apparent that the camera 10 and the front light source 9 are installed in this case opposite to the objects to be photographed in much the same manner as in the case illustrated in FIG. 2. By this means, there are therefore obtained the same advantageous effects in regard to illumination of the background 4a and of the objects to be photographed.

It should be observed in this connection that, in one case as in the other, the design concept of the device in accordance with the invention is such that photographs can be taken by an unskilled operator. There is in fact no adjustment to be made for taking portrait photographs or identity-card photographs since the various reflecting panels 6, 7 and 8 are so designed that they can be fixed beforehand in the exact positions required for the achievement of an optimum result. However, in the case of portrait photographs with more elaborate lighting, the operator has the possibility of adjusting the angle of slope of the reflecting panels.

As can readily be understood, it is possible to employ backgrounds having different characteristics according to the nature of the subject or of the objects to be photographed since it is only necessary to change the detachable sheet 4 or 4a constituting said background. However, when making use of a device of the type in which provision is made for a full (or solid) background panel 1a, the panel itself may in that case constitute the photographic background for taking a snapshot.

Figure 4:
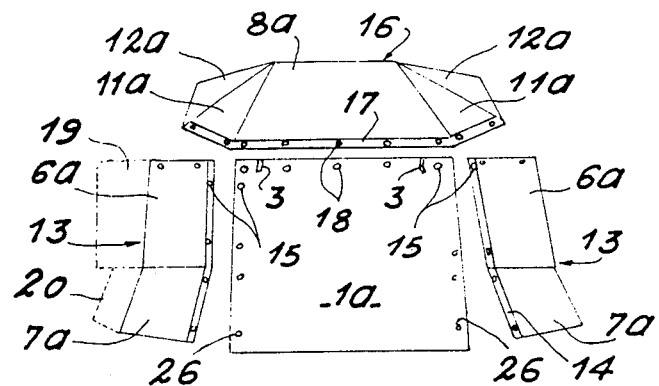
FIG. 4 illustrates a particular embodiment of the device in accordance with the invention and is an overhead plan view of the various elements which constitute said device and which are shown prior to assembly.

Moreover, the side panels 6, 7 or 6a, 7a may if necessary be adapted to carry additional reflecting flaps 19 and 20, a certain number of which are shown in FIG. 4. These additional flaps can be either stationarily or detachably fixed so that they my thus be used or not used according to requirements. Furthermore, these flaps and panels 6 may advantageously be so arranged as to ensure that the orientation of said flaps can be adjusted at will, for example by articulation along their line of junction with the panels, provision being also made for suitable locking means.

Figure 6:
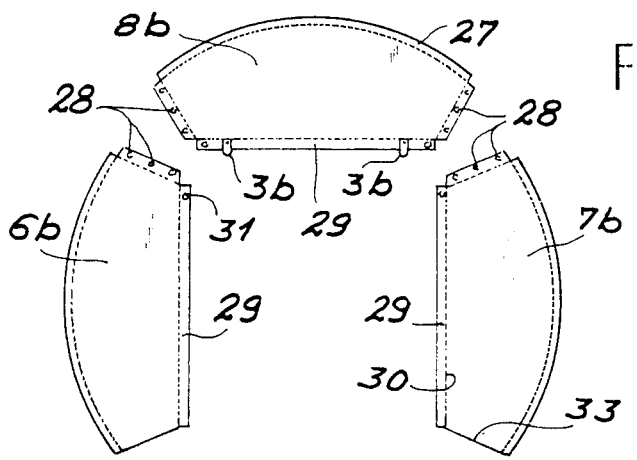
FIGS. 6 and 7 are views which are similar to FIG. 4 but show two other forms of construction of the device in accordance with the invention.

FIG. 6 illustrates another embodiment of the device in accordance with the invention. In this form of construction, the device is composed of three reflecting panels 6b, 7b and 8b which are intended to be assembled around a free surface of square or rectangular crosssection corresponding to the background proper of the photograph to be taken.

After assembly either at works or in situ, the assembly can be placed either against a wall or any other vertical surface or fixed on a tripod by placing the panel 8b at the top whilst the panels 6b and 7b are placed on each side. The background proper can be constituted by a sheet of paper 4 or 4a placed between these different panels. To this end, the bottom edge of the top panel 8b is provided with clips 3b for the attachment of a sheet of paper or the like.

The three panels 6b, 7b and 8b have a contour such that, after assembly, they are located in inclined planes with respect to the plane of the rear end-wall of the assembly. To this end, the contour of each of these panels has the general shape of a trapezium, the long base 27 of which is directed outwards and advantageously has a curved shape. If these three panels are not preassembled along their lines of junction, they can be assembled together by means such as press-studs 28 or like complementary coupling elements which are arranged on the opposite edges.

Preferably, the short base of each reflecting panel is adapted to carry a rectilinear strip 29 which is joined to the corresponding panel by means of an articulation line 30 which also serves as a hinge. When these panels have been assembled together, the three strips 29 aforesaid are located in the plane of the background wall of the assembly and virtually constitute a frame for said background wall. Press-studs 31 make it possible to assemble these strips together at the corners of said frame.

Figure 8:
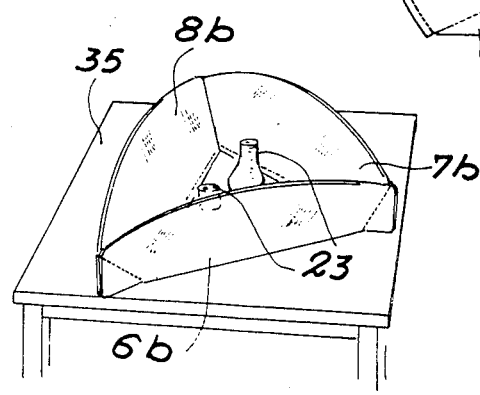
FIG. 8 is a view in perspective illustrating a particular mode of utilization of the device shown in FIG. 6.

The device thus formed can be mounted on a tripod or against a wall or any other vertical surface in order to be employed in the same manner as the devices illustrated in FIGS. 2 and 3 for taking snapshots of a person's head or of predetermined objects. However, in the last-mentioned application, the device can also be employed in the manner shown in FIG. 8. In such a case, the three reflecting panels 6b, 7b and 8b are attached one after the other without interruption so as to form a virtual pyramid frustum placed on a table 35 which serves as a support for the objects 23 to be photographed, these latter being arranged within the space which is left free between the three reflecting panels 6b, 7b and 8b. The photographic background of the assembly can be constituted by the top surface of the table 35 if this surface is suitable. However, it is also possible to place a sheet of paper or other suitable material on this table before placing objects to be photographed in order to serve as a background for the assembly.

Figure 9:
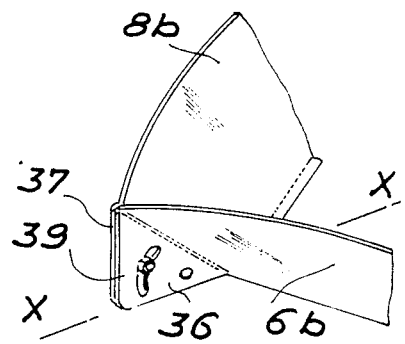
FIG. 9 is a detail view of an alternative embodiment of said device.
Figure 10:
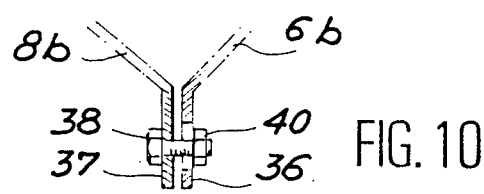
FIG. 10 is a sectional view taken along line X—X of FIG. 9.

FIGS. 9 and 10 illustrate a detail of an alternative form of construction of the device shown in FIG. 6. In this variant, each side panel 6b and 7b is joined to the top panel 8b by means which make it possible to modify the orientation of these side panels. In the example illustrated, the upper end of each side panel 6b or 7b has an articulated flap 36 which is mounted against a similar flap 37 carried by the top reflecting panel 8b. These two flaps are coupled together by means of a bolt 38 which is carried by one of said flaps and is capable of sliding within an arcuate slot 39 of the other flap. This accordingly makes it possible to modify the angle of slope of each side panel 6b or 7b so as to place the panel in a more or less upright position with respect to the background plane of the assembly. A nut 40 screwed onto the bolt 38 serves to lock each side panel in the desired orientation.

This arrangement makes it possible to modify the orientation of the side panels 6b and 7b as a function of the desired effects. However, the adjustment operations are very easy to perform and do not require the services of a skilled operator as is the case when using individual reflecting panels which have to be placed in each case in a particular position and orientation.

Figure 7:
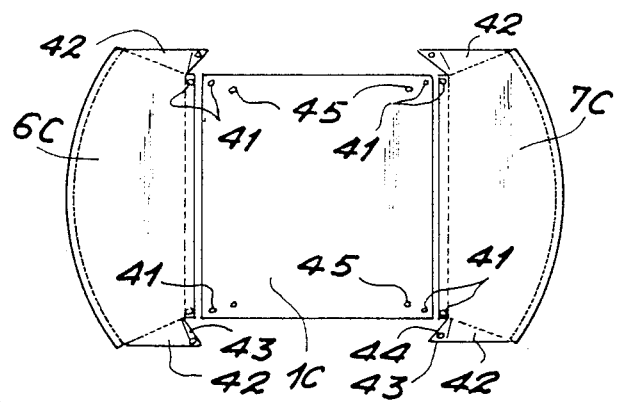

FIG. 7 illustrated yet another form of construction of the device in accordance with the invention. In this embodiment, the device is provided simply with two reflecting panels 6c and 7c which are similar to the panels 6b and 7b of the embodiment shown in FIG. 6. However, this device is fixed on a background panel 1c which is intended to serve as a support for the two side panels 6c and 7c, these latter being fixed on the corresponding edges of this background panel by means of coupling press studs 41.

Moreover, suitable means are provided for maintaining the two panels 6c and 7c in upright positions with respect to the rear end-wall of the assembly. In the example shown, each end of these lateral panels is adapted to carry an articulated flap 42 provided with an articulated base 43. This base is in fact provided with a pressstud 44 which is intended to be coupled with a complementary element 45 carried by the background panel 1c. When this coupling operation is completed, the two panels 6c and 7c are therefore maintained in upright positions. However, this function could be performed by any other suitable means such as, for example, right-angle support brackets or any other externally-mounted bearing members.

Figure 11:
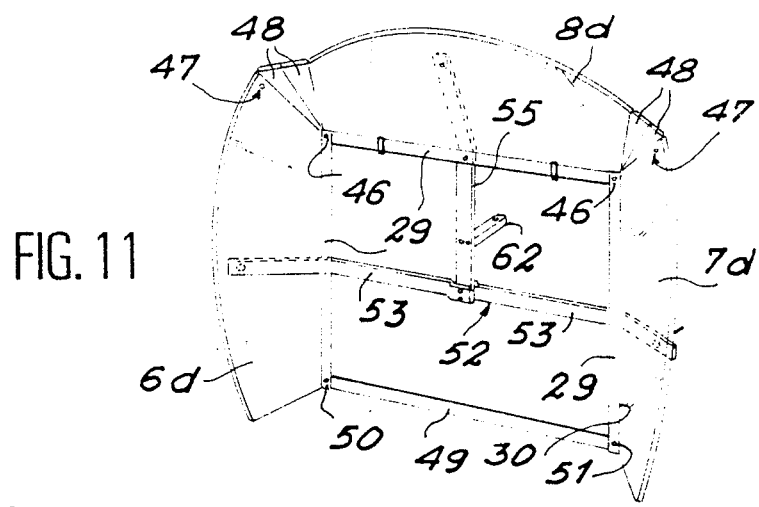
FIGS. 11 and 12 are respectively front and rear views in perspective and illustrate another embodiment of the device in accordance with the invention.
Figure 12:
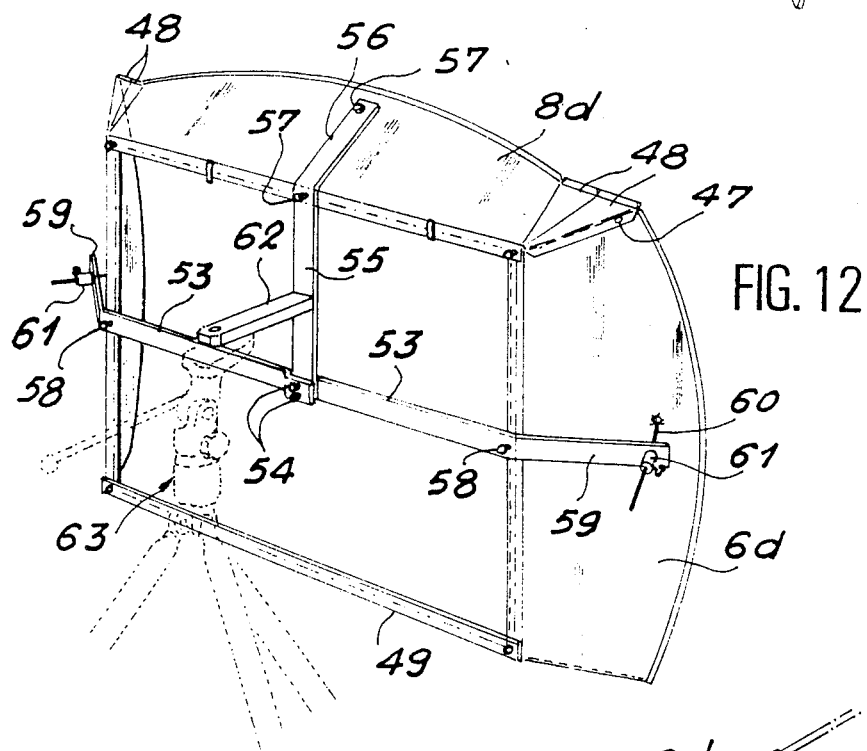
Figure 13:
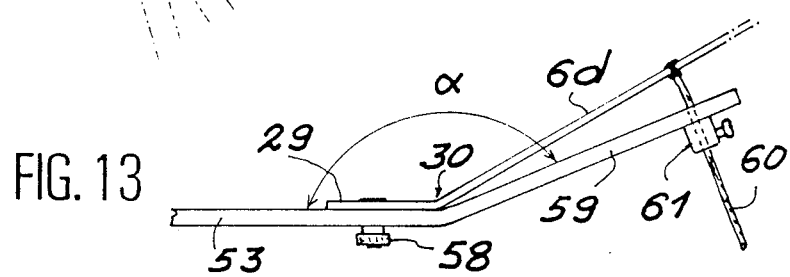
FIG. 13 is a fragmentary overhead plan view to a different scale and showing a detail of this embodiment.

FIGS. 11 to 13 illustrate a variant of the embodiment shown in FIG. 6. In this variant, the device is also constituted by three reflecting panels 6d, 7d and 8d each having an internal strip 29 and being articulated with respect to this latter by means of a folding line 30. The two side panels 6d and 7d are stationarily attached at either end of the top panel 8d by means of a pivot-pin 46. Furthermore, they are attached by means of a press-stud 47 to small intermediate flaps 48 carried by each end of the top panel 8d. It is only necessary to detach the press-studs 47 in order to fold-back the three panels 6d and 7d on top of each other. However, the small intermediate flaps could be dispensed with if necessary.

However, at their lower ends, the two side panels 6d and 7d are connected by means of a rigid crossmember 49, one end of which is stationarily attached to one of these panels by means of a pivot-pin 50. The opposite end of said cross-member is removably attached to the other side panel by means of a press-stud 51. It is thus only necessary to detach said press-stud at the time of folding-back of the assembly.

In addition, provision is made for a framework which has the function of rigidifying and if necessary of supporting the assembly. This framework includes another horizontal cross-member 52 located at the mid-height. This cross-member is constituted by two cross-strips 53 which are movably attached at the center of the assembly by means of screws and nuts 54. The screws and nuts provided at this point also have the function of securing said cross-member to a vertical upright member 55, the upper end 56 of which extends behind the top panel 8d. This upper end is bent-back at the desired angle while taking into account the intended angle of slope of the panel and is detachably fastened to said panel by means of a screw and nut 57.

In regard to the two cross-strips 53 which constitute the central cross-member 52, they are removably fixed to the rear sides of the edge-strips 29 of the side panels 6d and 7d, this being carried out by means of screws and nuts 58. The end portions 59 of said crossstrips extend behind each side panel. However, said end portions are bent-back at an angle which corresponds to the maximum angle of outward slope at which the side panels are intended to be set. Moreover, a cable 60 or the like is attached to each side panel and passed through a locking collar 61 carried by the end portion 59 of the corresponding cross-strip 53. It is thus possible to modify the inclination of the side panels and to lock them in position at the desired angle. However, any other suitable means could be provided for carrying out this locking function and adjusting the inclination of the side panels.

The upright member 55 of the structure thus provided is adapted to carry a rear support bracket 62 for fixing this framework on a suitable support such as, for example, the upper end of a folding or telescopic tripod 63 of the type employed in photography.

The device thus formed as well as the device of FIG. 7 can be employed in the same manner as the devices shown in FIGS. 2 and 3 for photographing the head of a subject or for photographing predetermined objects.

Depending on the forms of construction considered, the device in accordance with the invention may therefore have a greater or lesser number of reflecting panels placed around the surface which is intended to materialize the background of the assembly, these panels being either attached directly to each other in succession (case of FIGS. 1 to 6) or connected indirectly by means of a background panel (case of FIG. 7).

Again depending on the forms of construction considered, the device in accordance with the invention may have a background panel (case of FIGS. 4 and 7) or else may not have any background panel (case of FIGS. 1 and 6), in which case a frame 1 is advantageously provided in the background plane of the assembly although this is not indispensable. This frame may accordingly be adapted to carry an element for fixing it on a tripod which serves as a support for the assembly.

In all the cases considered in the foregoing, the assembly constituted by the present device always has a generally concave shape or the shape of a dish having sloping walls but open on one or more sides.

Finally, it is of interest to recall that the use of the device in accordance with the invention is not limited to the construction of a background and a reflecting frame which are placed behind and around a predetermined subject when taking a photograph or the like. In fact, this device may also be employed as a background and reflecting frame behind and around certain objects in a display window such as, for example, a shop window, one or a number of light sources being provided opposite to the assembly.

What is claimed is:

1. A device for side-lighting a subject placed in front of a background as well as lighting the background itself when taking pictures of the subject by photography, cinematography or the like comprising a plurality of reflecting panels, background means for providing a common central background on a plane for the subject to be photographed, said plurality of reflecting panels being respectively attached to said background means in surrounding relationship to said common central background, said plurality of reflecting panels being disposed in inclined positions with respect to the plane of said background means at angles such that said plurality of panels are capable of reflecting the light emitted by a front light source towards the subject to be photographed as well as towards said central common background, said plurality of reflecting panels and said background means together forming a configuration of a generally concave shape.

2. The device according to claim 1 where said background means is a solid background.

3. The device according to claim 1 wherein said background means forms a hollowed-out background.

4. The device according to claim 1 wherein said reflecting panels are selectively detachable from said background means, coupling means for detachably affixing said reflector panels to said background means.

5. The device according to claim 1 wherein said reflecting panels are provided with means for adjusting their inclination with respect to said common central background.

6. The device according to claim 1 wherein said plurality of reflecting panels comprises three reflecting panels, said background means being a background panel forming a rear end-wall, one of said reflecting panels being attached to the top of said background panel and the other two of said reflecting panels being respectively attached to said background panel on each side of the subject to be photographed.

7. The device according to claim 1 wherein said plurality of reflecting panels includes two reflecting panels respectively disposed on two sides of said background means, said background means being a background panel, said background panel serving as a support for said two reflecting panels.

8. A device for side-lighting a subject placed in front of a background as well as lighting the background itself when taking pictures of the subject by photography, cinematography or the like comprising a plurality of reflecting panels attached to each other around a free surface lying in a plane and arranged to be disposed in back of the subject to be photographed, said plurality of reflecting panels being disposed in inclined positions with respect to the said plane of said free surface at angles such that said reflecting panels are capable of reflecting the light emitted by a front light source towards the subject to be photographed as well as towards said said free surface, said plurality of reflecting surfaces and said free surface being of a generally concave shape.

9. The device according to claim 8 further including fastening means for permitting attachment of a background element at said free surface providing the photographic background.

10. The device according to claim 8 wherein said plurality of reflecting panels are detachable from each other, coupling means provided on said plurality of reflecting panels for attaching said reflector panels to each other around said free surface.

11. The device according to claim 8 wherein said plurality of reflecting panels are provided with means for adjusting their inclination with respect to said free surface.

12. The device according to claim 8 wherein said plurality of reflecting panels comprises three reflecting panels disposed around said free surface, one of said reflecting panels being place above said free surface and the other two reflecting panels being on each side of the subject to be photographed.

13. A device for side-lighting a subject placed in front of a background as well as for lighting the background itself when taking pictures of the subject by photography, cinematography or the like comprising a plurality of reflecting panels, background means being disposed adjacent each of said plurality of reflecting panels for forming an end wall portion, said plurality of reflecting panels being attached to said background means, said plurality of reflecting means being disposed in inclined positions with respect to the plane of said background means at angles such that said panels are capable of reflecting the light emitted by a front light source towards the subject to be photographed as well as towards said background means, said plurality of reflecting panels and said background means together being generally of a concave shape.

14. The device according to claim 13 further comprising fastening means for permitting attachment of an added element to said background means for constituting the photographic background proper.

15. The device according to claim 13 wherein said reflecting panels are detachable, coupling means for affixing said plurality of reflecting panels to said background means.

16. The device according to claim 13 wherein said plurality of reflecting panels are provided with means for adjusting their inclination with respect to said background means lying said end wall portion.

17. The device according to claim 13 wherein said background means is a frame lying in a frame, said plurality of reflecting panels includes three reflecting panels disposed around said frame rear wall portion, one of said reflecting panels being positioned on the top of said frame, and the other two of said reflecting panels being placed on opposite sides of said frame on each side of the subject to be photographed.

18. The device according to claim 13 wherein said plurality of reflecting panels includes two reflecting panels disposed on two sides of said frame means, said frame means serves as a support for said two reflecting panels.

19. The device according to claim 13 further comprising a rigid framework having detachable elements including means for locking the reflecting panels at the desired angle of slope to said framework, said framework adapted to carry a member for fixing said framework on a suitable support.

20. The device according to claim 19 wherein said means for locking the reflecting panels provides for adjustment of said desired angle of slope of said reflecting panels to said framework.

* * * * *